United States Patent
Threet et al.

(10) Patent No.: US 7,246,733 B2
(45) Date of Patent: Jul. 24, 2007

(54) APPARATUS FOR CARRYING CARGO

(75) Inventors: Stephen W. Threet, North Augusta, SC (US); Jack T. Mason, Jr., Hephzibah, GA (US)

(73) Assignee: Everthere Carriers, L.L.C., North Augusta, SC (US)

( * ) Notice: Subject to any disclaimer, the term of this patent is extended or adjusted under 35 U.S.C. 154(b) by 174 days.

(21) Appl. No.: 10/640,900

(22) Filed: Aug. 14, 2003

(65) Prior Publication Data

US 2005/0035167 A1    Feb. 17, 2005

(51) Int. Cl.
  *B60R 9/06* (2006.01)
(52) U.S. Cl. .................. 224/498; 224/499; 224/519; 224/526
(58) Field of Classification Search ............. 224/497, 224/498, 499, 519, 521, 524, 526, 549, 585; 190/16
See application file for complete search history.

(56) References Cited

U.S. PATENT DOCUMENTS

| | | | |
|---|---|---|---|
| 1,308,139 A * | 7/1919 | Zagelmeyer ................... 5/119 |
| 1,595,622 A * | 8/1926 | Sanborn ....................... 190/16 |
| 2,602,252 A * | 7/1952 | Shinn ........................... 40/610 |
| 4,744,590 A | 5/1988 | Chesney |
| 4,813,584 A | 3/1989 | Wiley |
| 4,893,711 A * | 1/1990 | Gustafson ................ 206/45.24 |
| 5,169,042 A * | 12/1992 | Ching ......................... 224/535 |
| 5,368,209 A * | 11/1994 | Hill ............................. 224/497 |
| 5,645,292 A | 7/1997 | McWilliams et al. |
| 5,810,374 A | 9/1998 | Small |
| 5,996,869 A | 12/1999 | Belinky et al. |
| 6,253,981 B1 * | 7/2001 | McLemore ................. 224/526 |
| 6,382,486 B1 | 5/2002 | Kretchman et al. |
| 6,513,690 B1 | 2/2003 | Churchill et al. |
| 6,662,983 B2 * | 12/2003 | Lane et al. ................. 224/405 |
| 6,712,248 B2 * | 3/2004 | Mitchell ...................... 224/499 |
| 2004/0112364 A1 * | 6/2004 | Johnson et al. ........... 126/41 R |

* cited by examiner

*Primary Examiner*—Stephen K. Cronin
(74) *Attorney, Agent, or Firm*—Dority & Manning, P.A.

(57) ABSTRACT

The present invention discloses and claims an apparatus for attaching to a vehicle for carrying cargo. The apparatus includes a base and at least one wing having retracted and extended positions. The apparatus occupies a smaller volume when the wing is retracted than when the wing is extended.

17 Claims, 5 Drawing Sheets

APPARATUS FOR CARRYING CARGO

BACKGROUND OF THE INVENTION

It is known in the art to attach a platform to a vehicle for increasing the carrying capacity of the vehicle. The platform generally consists of a rectangular surface that attaches to a trailer or receiver hitch on the vehicle. In this manner, the platform undesirably extends the length of the vehicle. However, the benefit of carrying additional cargo external to the vehicle generally outweighs the detriment of lengthening the vehicle.

When additional carrying capacity is not needed, it is desirable to store the platform in a convenient, readily accessible location. One solution, as shown in U.S. Pat. Nos. 4,744,590; 6,382,486; and 6,513,690, is to fold the platform toward the vehicle and leave the platform attached to the vehicle in this folded position. Although this solution ensures that the platform is readily accessible, the platform still adds some length to the vehicle. In addition, the folded platform may be aesthetically undesirable or it may interfere with the vehicle's trunk or tailgate operation.

Another solution is to remove the platform from the vehicle and store the platform until needed. Although this solution restores the vehicle to its original length, the platform is generally too bulky to store inside the vehicle, and storing the platform separate from the vehicle limits the accessibility of the platform.

Therefore, the need exists for a cargo carrier that can increase the carrying capacity for a vehicle and that can also be conveniently stored with the vehicle when not in use.

SUMMARY OF THE INVENTION

Objects and advantages of the invention are set forth below in the following description, or may be obvious from the description, or may be learned through practice of the invention.

In one embodiment of the invention, an apparatus for attaching to a vehicle for carrying cargo includes a base, a mounting sleeve for attaching the apparatus to the vehicle, and a wing moveably connected to the base. The wing has extended and retracted positions so that the wing is substantially coplanar with the base in the extended position and transverse to the base in the retracted position. Furthermore, the apparatus occupies a smaller volume when the wing is in the retracted position than when the wing is in the extended position.

In other embodiments of the invention, the apparatus may include more than one wing moveably connected to the base. One or more of the wings may include an inner section moveably attached to an outer section so that the inner section resides within the outer section in the retracted position. Alternately, the outer section may reside in the inner section in the retracted position. The apparatus may further include a locking mechanism for locking one of the wings in the retracted position.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which: . . .

DETAILED DESCRIPTION OF PREFERRED EMBODIMENTS

Reference will now be made in detail to present embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

The present invention relates to a collapsible cargo carrier that attaches to a vehicle to increase the carrying capacity of the vehicle. When not in use, the carrier folds up for convenient detachment and storage within the vehicle.

Figure 1:
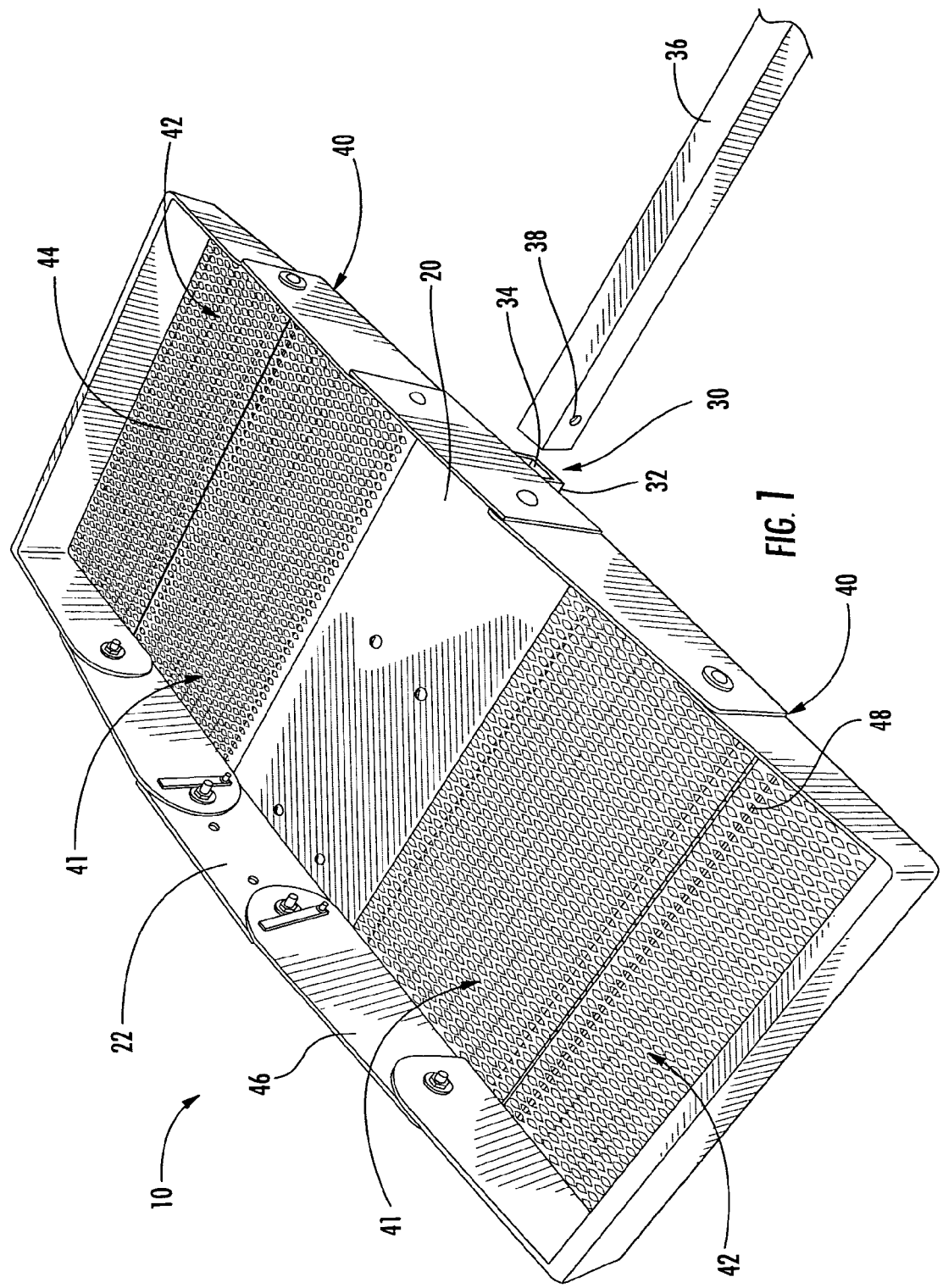
FIG. 1 is a perspective view of an embodiment of the present invention.

As shown in FIG. 1, the carrier 10 generally includes a base 20, a mounting sleeve 30, and one or more wing assemblies 40. The base 20 provides a sturdy foundation to which the other components may attach. The base 20 is typically a flat, solid structure, as shown in FIG. 1, or it may include perforations to reduce its weight. The base 20 may be made of metal, plastic, fiberglass, or a combination thereof, depending on the particular uses and needs. The base may include one or more raised sides 22 to further define the carrier 10 and provide additional attachment points.

The mounting sleeve 30 fixedly attaches to the base 20 and provides a means for attaching the carrier 10 to a vehicle. As shown in FIG. 1, the mounting sleeve 30 may be a square collar 32 with an aperture 34 suited to mate with a drawbar 36 from a conventional receiver hitch. The mounting sleeve 30 receives the drawbar 36, and a clevis pin, cotter pin, bolt, or other suitable structure (not shown) fits through a hole 38 in the mounting sleeve 30 and drawbar 36 to secure the mounting sleeve 30 to the drawbar 36. In other embodiments, the mounting sleeve 30 may be a clamp, vice grip, or other structure more suitable for securely engaging the carrier 10 to a ball-type trailer hitch.

The wing assemblies 40 moveably connect to the base 20 and provide the remainder of the surface area for carrying cargo. FIG. 1 illustrates one embodiment of a carrier 10 with symmetric, multi-sectional wing assemblies 40 on opposing sides of the carrier's longitudinal axis, although other orientations are within the scope of the present invention. Moreover, although FIG. 1 depicts an embodiment with each wing assembly 40 having an inner section 41 and an outer section 42, it should be understood by one of ordinary skill in the art that wing assemblies 40 having fewer or more sections are within the scope of the present invention.

Each wing assembly 40 includes an expanded metal surface 44, vertical siding 46, and horizontal support bars 48. The expanded metal surface 44 extends between the vertical siding 46 and provides the horizontal surface area for carrying cargo. The use of expanded metal reduces the weight of the wing assembly 40; however, it should be understood by one of ordinary skill in the art that a solid sheet of material is an equivalent substitute within the scope of the present invention.

Figure 2:
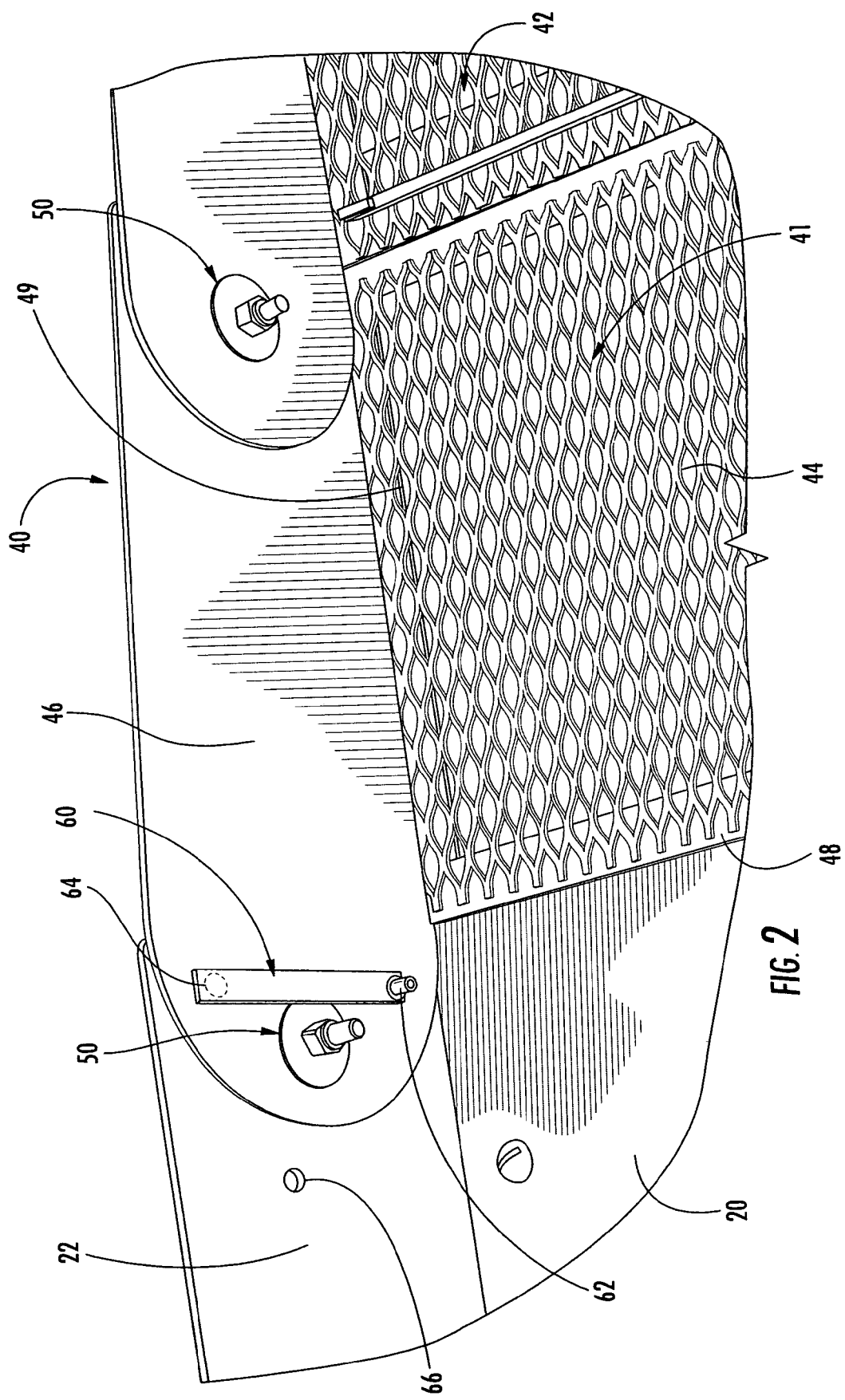
FIG. 2 is a close-up perspective view of the embodiment depicted in FIG. 1.

The vertical siding 46 defines the perimeter and provides additional structural support for the wing assemblies 40. The vertical siding 46 may include a slideable attachment 50 and/or a locking mechanism, as shown in more detail in FIG. 2. The slideable attachment 50 allows relative movement between two parts, such as between the wing assembly 40 and the base 20 or between inner 41 and outer 42 sections of the wing assembly 40. The slideable attachment 50 may use rivets, bolts, hinges, slides, or other suitable substitutes. In alternate embodiments, the slideable attachment 50 may be located on other parts of the wing assembly 40, such as the underside of the expanded metal surface 44 and/or horizontal support bars 48.

The locking mechanism secures the wing assembly 40 in a desired position. Although various suitable mechanisms are known to one of ordinary skill in the art and within the scope of the present invention, one such mechanism is a spring button 60 depicted in FIGS. 1, 2, and 3. As shown, the spring button 60 attaches to the vertical siding 46 at one end 62 and has a button (not shown) at the other end 64. The button fits into a detent 66 in the vertical siding 46 to lock the wing assembly 40 into retracted or extended positions.

The horizontal support bars 48 extend between the vertical siding 46 and provide structural support for the expanded metal surface 44. In one embodiment, the horizontal support bars 48 attach to the vertical siding 46 using rivets, bolts, tack welds, or similar suitable methods. The expanded metal surface 44 then attaches to the horizontal support bars 48 in similar fashion. In another embodiment, the vertical siding 46 includes a support flange 49, and the horizontal support bars 48 attach to the support flange 49. The expanded metal surface 44 in turn attaches to the horizontal support bars 48 and/or the vertical siding 46. It should be understood by one of ordinary skill in the art that alternate embodiments within the scope of the present invention may employ other methods for securing the expanded metal surface 44, vertical siding 46, and horizontal support bars 48.

Figure 3:
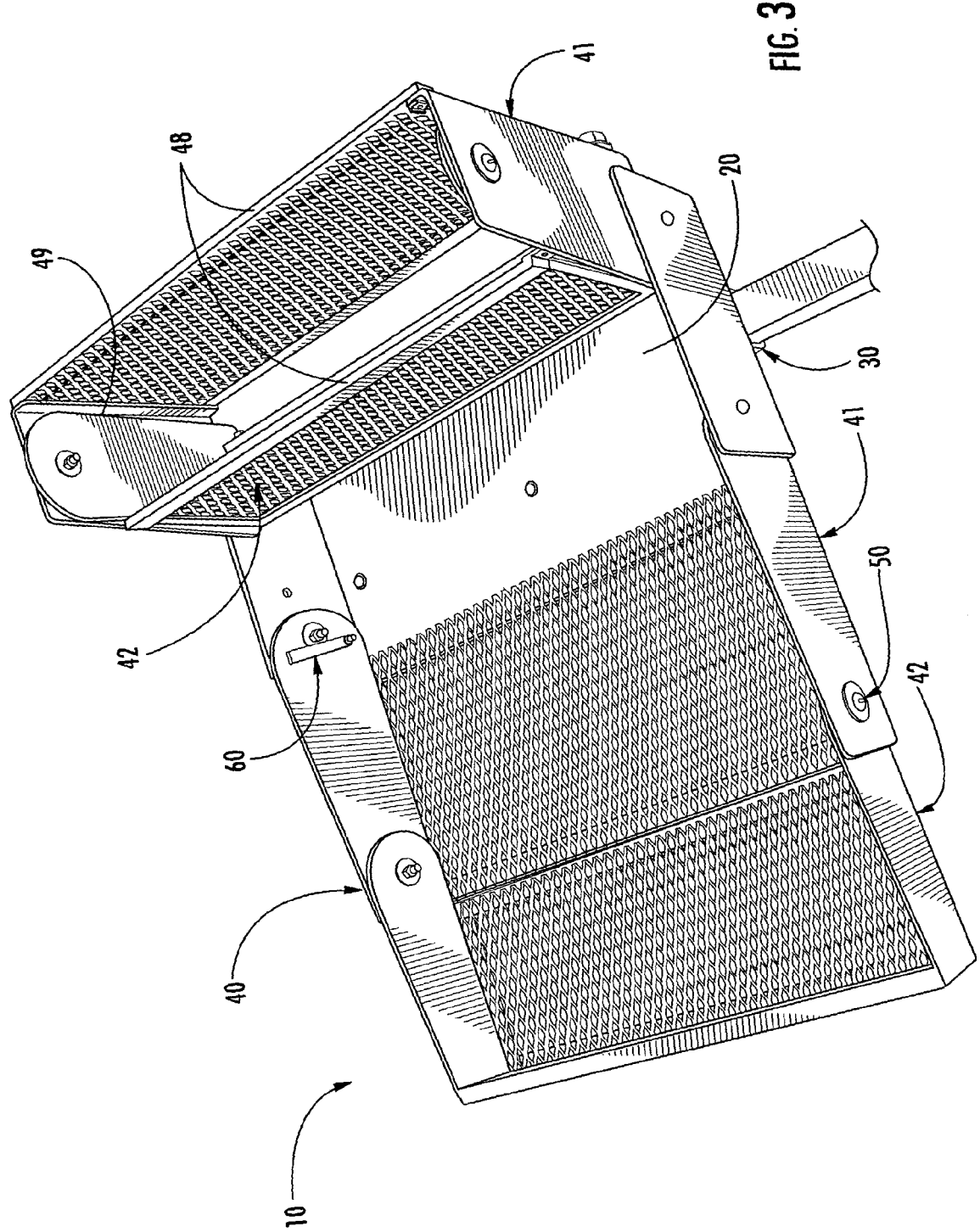
FIG. 3 is a perspective view of the embodiment depicted in FIG. 1 as partially folded.
Figure 4:
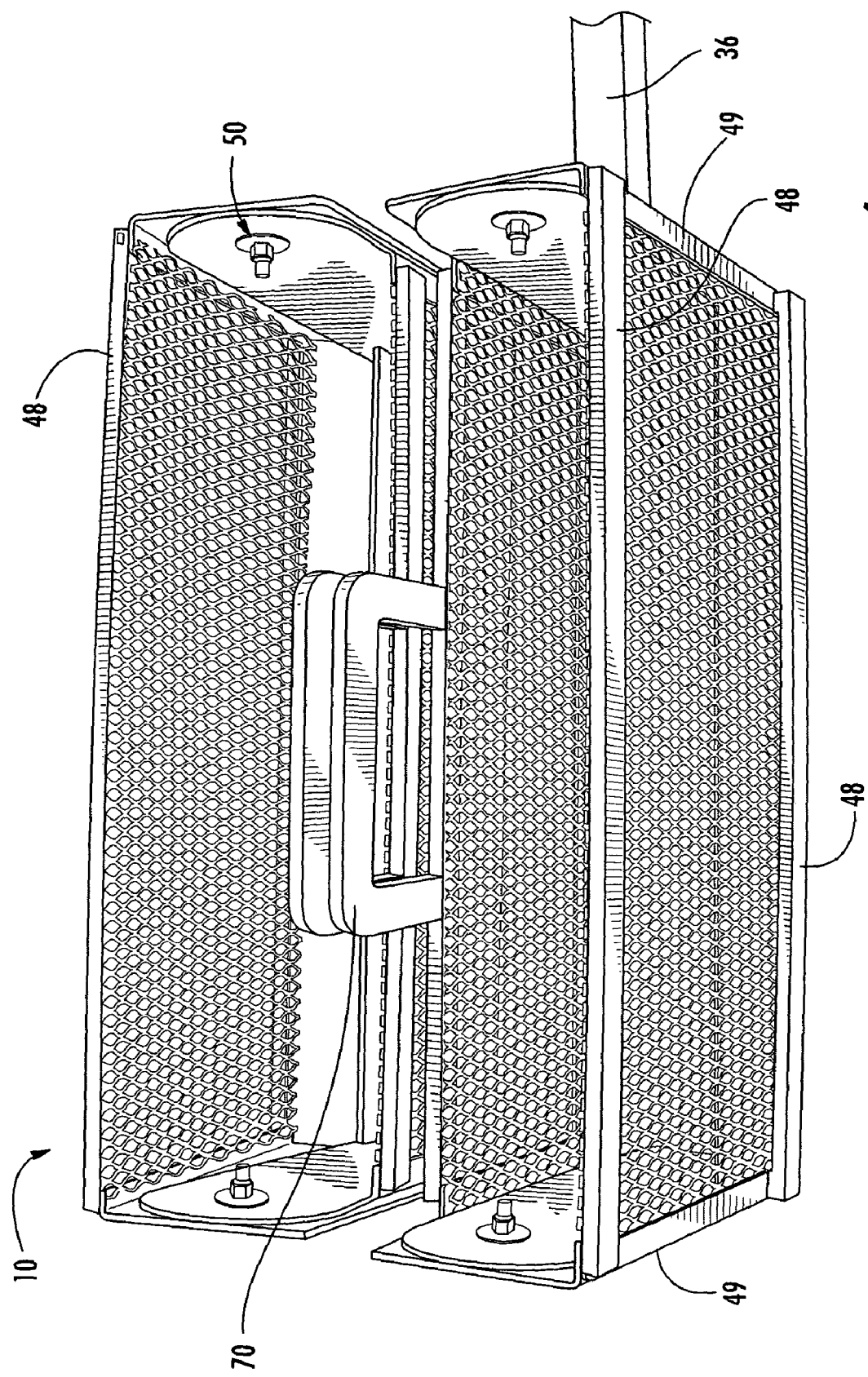
FIG. 4 is a perspective view of the embodiment depicted in FIG. 1 as fully folded.

FIGS. 1, 3, and 4 illustrate one embodiment of the present invention in various positions. In FIG. 1, the carrier 10 is fully extended, as it would be when installed on a vehicle. To fully retract one wing assembly 40, as depicted in FIG. 3, the outer section 42 of the wing assembly 40 folds into the inner section 41. The spring button 60 is then depressed to unlock the wing assembly 40, and the entire wing assembly 40 rotates roughly perpendicular to the base 20 until the spring button 60 locks the wing assembly 40 in a fully retracted position. FIG. 4 depicts the carrier 10 in a fully retracted position, as it would be when installing or removing the carrier 10 on a vehicle or when the carrier 10 is in storage.

FIG. 4 depicts an additional feature present in some embodiments of the present invention. As shown, the wing assemblies 40 may further include a U-shaped structure 70 attached to the horizontal support bars 48, or other suitable structure on the wing assembly 40. When the wing assembly 40 is in the folded position, the U-shaped structure 70 serves as a convenient handle for moving the carrier 10. In the extended position, the U-shaped structure 70 is beneath the expanded metal surface 42 and provides additional support for the wing assembly 40.

Figure 5:
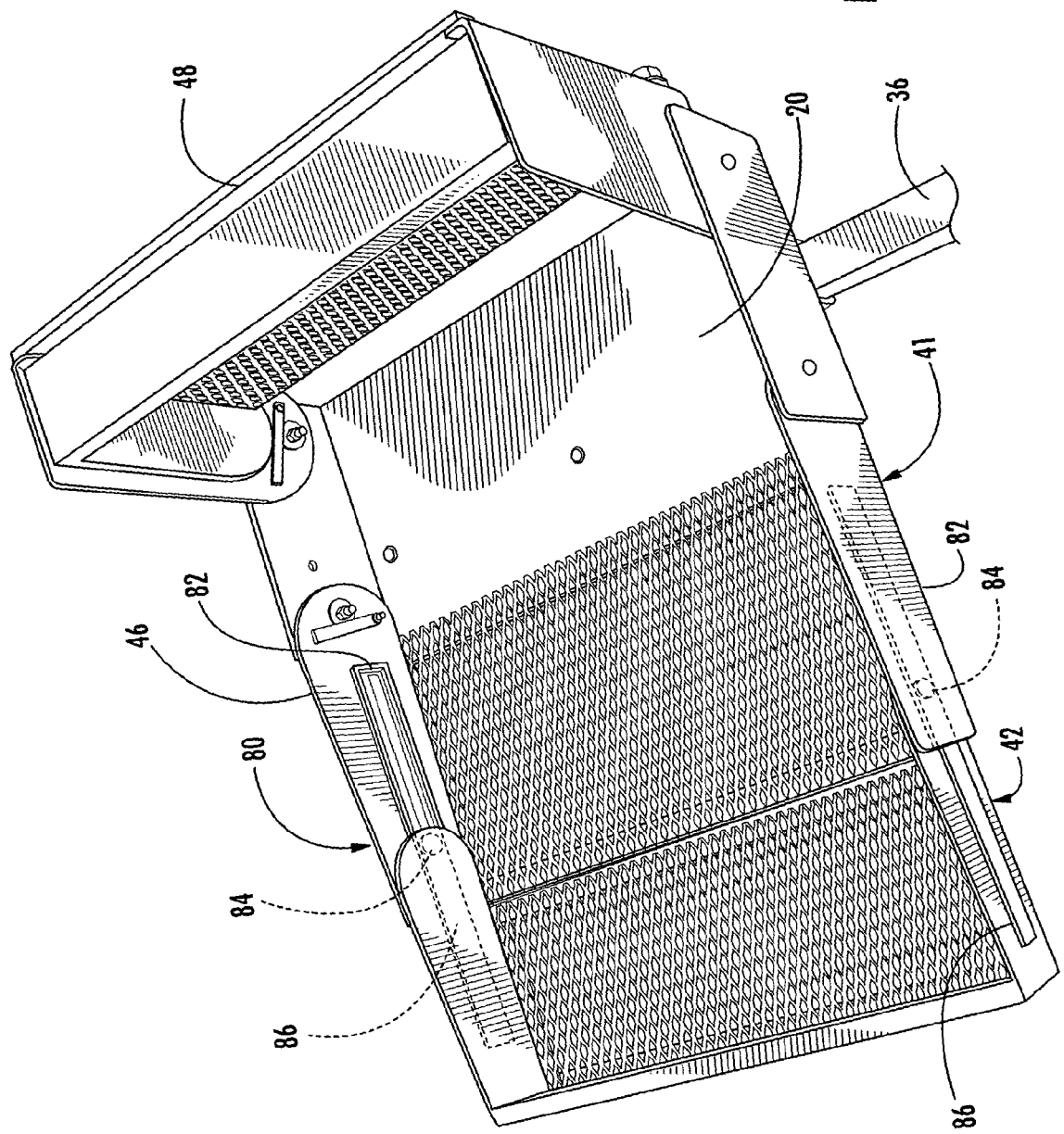
FIG. 5 is a perspective view of an alternate embodiment of the present invention as partially folded.

FIG. 5 depicts an alternate embodiment of the present invention with a modified wing assembly 80. The modified wing assembly 80 includes an extension slide 82 mounted on the vertical siding 46 for slideably connecting the inner 41 and outer 42 sections. The extension slide 82 includes a ball bearing or nylon roller 84 that rides in a track 86 between the inner 41 and outer 42 sections, although other types of extension slides are known to one of ordinary skill in the art and within the scope of the present invention. In the modified wing assembly 80, the outer section 42 slides on the extension slide 80 toward or away from the base 20 to reach a retracted or extended position, respectively. In this manner, the carrier has retracted and extended positions, as before. In addition, the carrier also has intermediate positions in which the modified wing assemblies 80 are rotated to be coplanar with the base 20 while one or both of the outer sections 42 remains retracted within its associated inner section 41.

It should be appreciated by those skilled in the art that modifications and variations can be made to the embodiments of the invention set forth herein without departing from the scope and spirit of the invention as set forth in the appended claims and their equivalents.

What is claimed is:

1. A cargo carrying apparatus for a vehicle, comprising:
   a. a base defining a planar carrying surface;
   b. a mounting sleeve proximate to said base for attaching said base to the vehicle;
   c. a first wing moveably connected to said base;
   d. a second wing moveably connected to said base and opposite said first wing;
   e. said first and second wings each having an extended and a retracted position, said extended position being in a substantially horizontal plane;
   f. wherein said first and second wings are substantially coplanar with said base in said extended position, said planar carrying surface of said base and said first and second wings in said extended position being configured to transport cargo;
   g. wherein said first and second wings are transverse to said base in said retracted position; and
   h. wherein said first and second wings each comprise an inner section proximate to said base and an outer section moveably attached to said inner section and separated from said base by said inner section in said extended position.

2. The cargo carrying apparatus of claim 1, wherein said cargo carrying apparatus occupies a smaller volume when at least one of said first and second wings is in said retracted position than when both of said first and second wings are in said extended position.

3. The cargo carrying apparatus of claim 1, wherein for at least one of said first and second wings, said outer section resides within said inner section in said retracted position.

4. The cargo carrying apparatus of claim 1, wherein for at least one of said first and second wings, said inner section resides within said outer section in said retracted position.

5. The cargo carrying apparatus of claim 1, wherein at least one of said first and second wings further includes a hinge for moveably attaching said inner section to said outer section.

6. The cargo carrying apparatus of claim 1, wherein said base includes a locking mechanism for locking at least one of said first and second wings in said retracted position.

7. A cargo carrying apparatus for a vehicle, comprising:
   a. a base defining a planar carrying surface;
   b. a mounting sleeve proximate to said base for attaching said base to the vehicle;
   c. a first wing moveably connected to said base;
   d. a second wing moveably connected to said base and opposite said first wing;
   e. wherein each of said first and second wings has an extended and a retracted position, said planar carrying surface of said base and said first and second wings in said extended position being configured to transport cargo; and
   f. wherein said first and second wings each comprise an inner section proximate to said base and an outer section moveably attached to said inner section and separated from said base by said inner section in said extended position.

8. The cargo carrying apparatus of claim 7, wherein said first and second wings are substantially coplanar with said base in said extended position.

9. The cargo carrying apparatus of claim 7, wherein said first and second wings are transverse to said base in said retracted position.

10. The cargo carrying apparatus of claim 7, wherein said cargo carrying apparatus occupies a smaller volume when at least one of said first and second wings is in said retracted position than when both of said first and second wings are in said extended position.

11. The cargo carrying apparatus of claim 7, wherein for at least one of said first and second wings, said outer section resides within said inner section in said retracted position.

12. The cargo carrying apparatus of claim 7, wherein for at least one of said first and second wings, said inner section resides within said outer section in said retracted position.

13. The cargo carrying apparatus of claim 7, wherein at least one of said first and second wings further includes a hinge for moveably attaching said inner section to said outer section.

14. The cargo carrying apparatus of claim 7, wherein said base includes a locking mechanism for locking at least one of said first and second wings in said retracted position.

15. A cargo carrying apparatus for a vehicle, comprising:
   a. a base defining a planar carrying surface;
   b. a mounting sleeve proximate to said base for attaching said base to the vehicle;
   c. a first wing moveably connected to said base and having an extended and a retracted position;
   d. wherein said cargo carrying apparatus occupies a smaller volume when said first wing is in said retracted position than when said first wing is in said extended position, said planar carrying surface of said base and said first wing in said extended position being configured to transport cargo; and
   e. wherein said first wing comprises an inner section proximate to said base and an outer section moveably attached to said inner section and separated from said base by said inner section in said extended position.

16. The cargo carrying apparatus of claim 15, wherein said first wing is transverse to said base in said retracted position.

17. The cargo carrying apparatus of claim 15, further including a second wing moveably connected to said base and opposite said first wing.

* * * * *